No. 712,478. Patented Nov. 4, 1902.
T. BEMIS.
PNEUMATIC DESPATCH TUBE SYSTEM.
(Application filed May 17, 1902.)
(No Model.) 6 Sheets—Sheet 1.
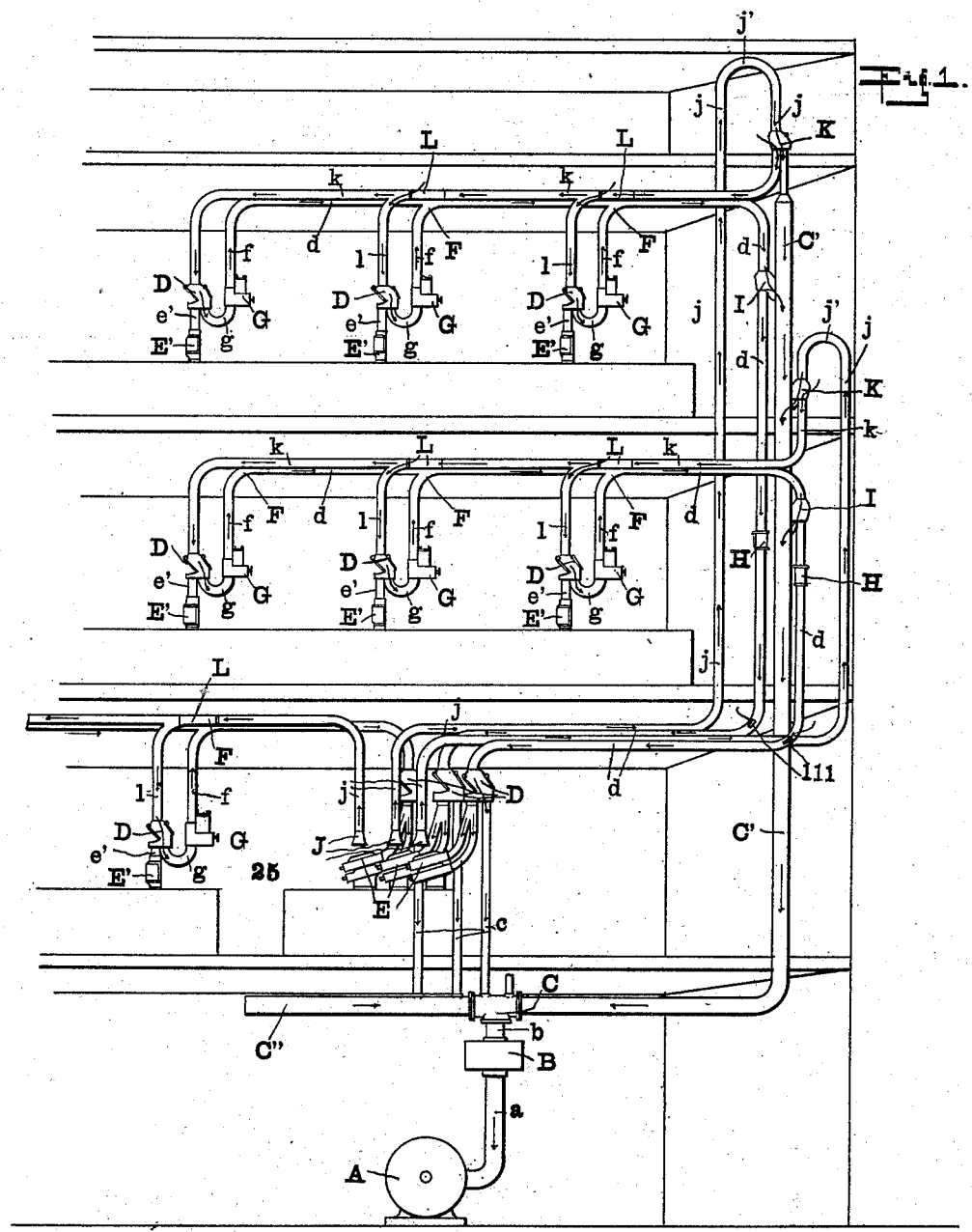
WITNESSES
INVENTOR
Thomas Bemis
BY
ATTORNEYS

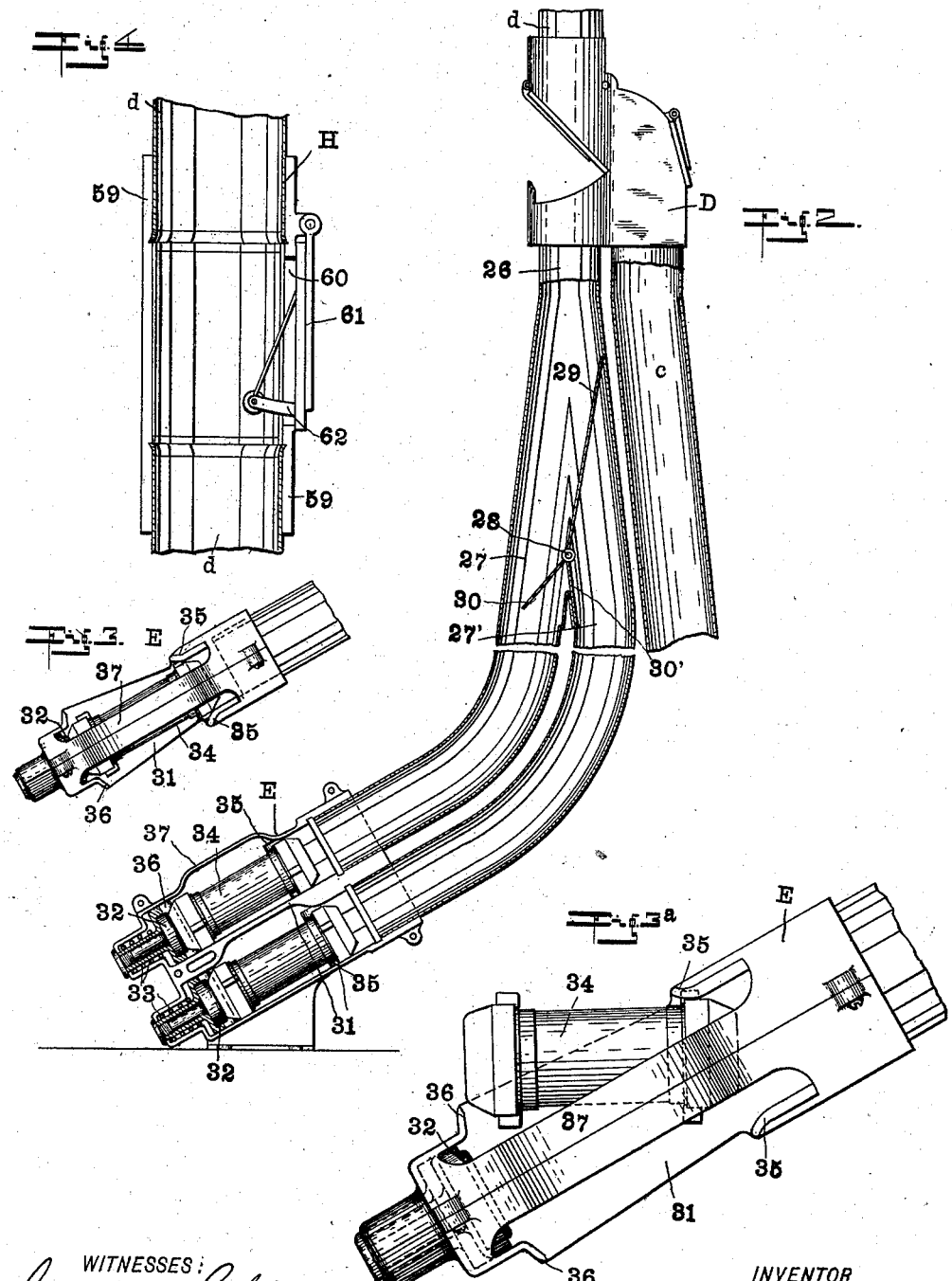

No. 712,478. Patented Nov. 4, 1902.
T. BEMIS.
PNEUMATIC DESPATCH TUBE SYSTEM.
(Application filed May 17, 1902.)
(No Model.) 6 Sheets—Sheet 3.
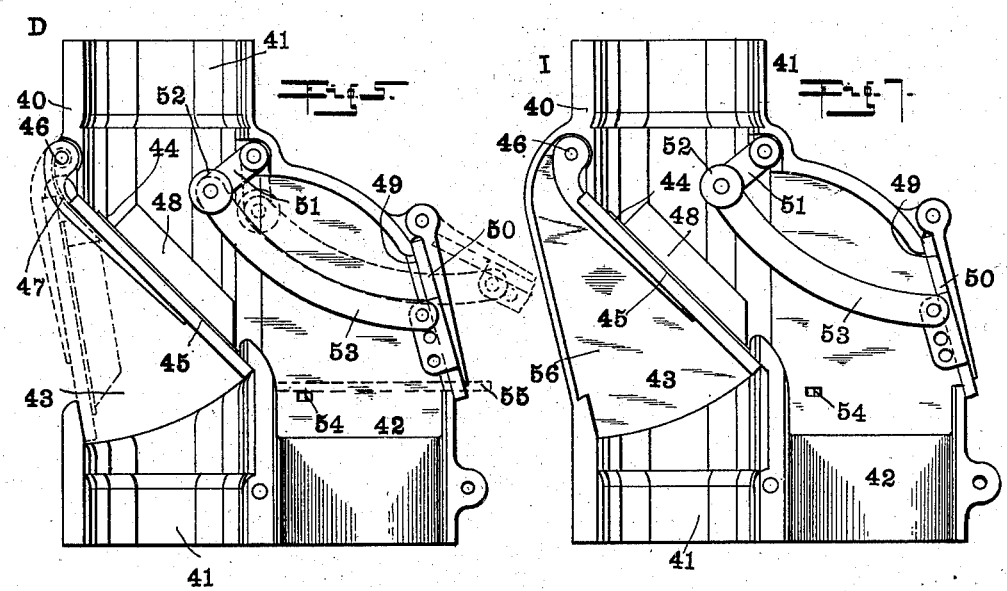
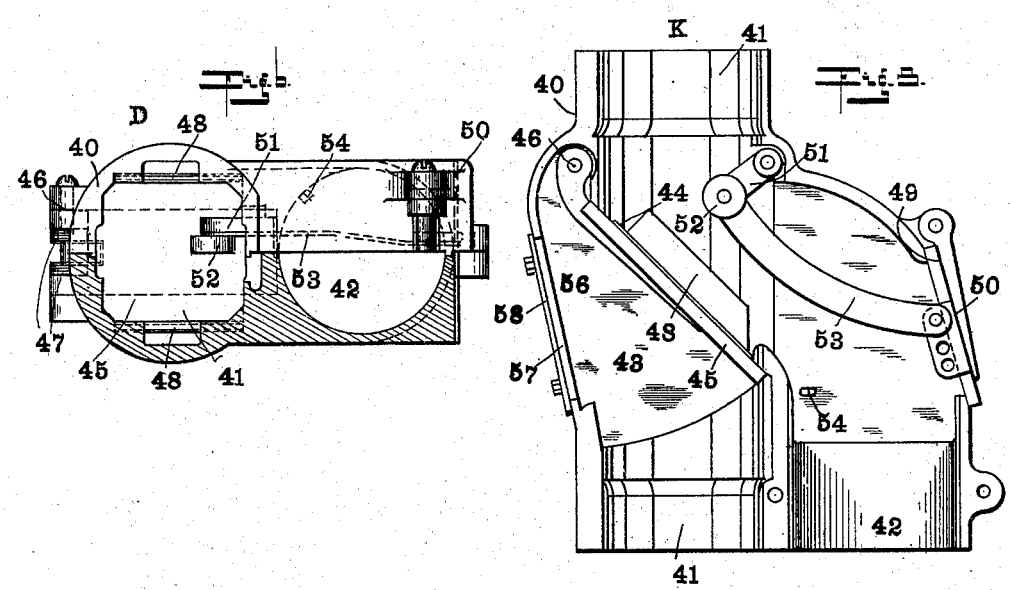
WITNESSES:
Frank A. Lahle
J. A. Walsh.
INVENTOR
Thomas Bemis
BY
Badford & Hood
ATTORNEYS No. 712,478.  
Patented Nov. 4, 1902.  
T. BEMIS.  
PNEUMATIC DESPATCH TUBE SYSTEM.  
(Application filed May 17, 1902.)  
(No Model.)  
6 Sheets—Sheet 4.
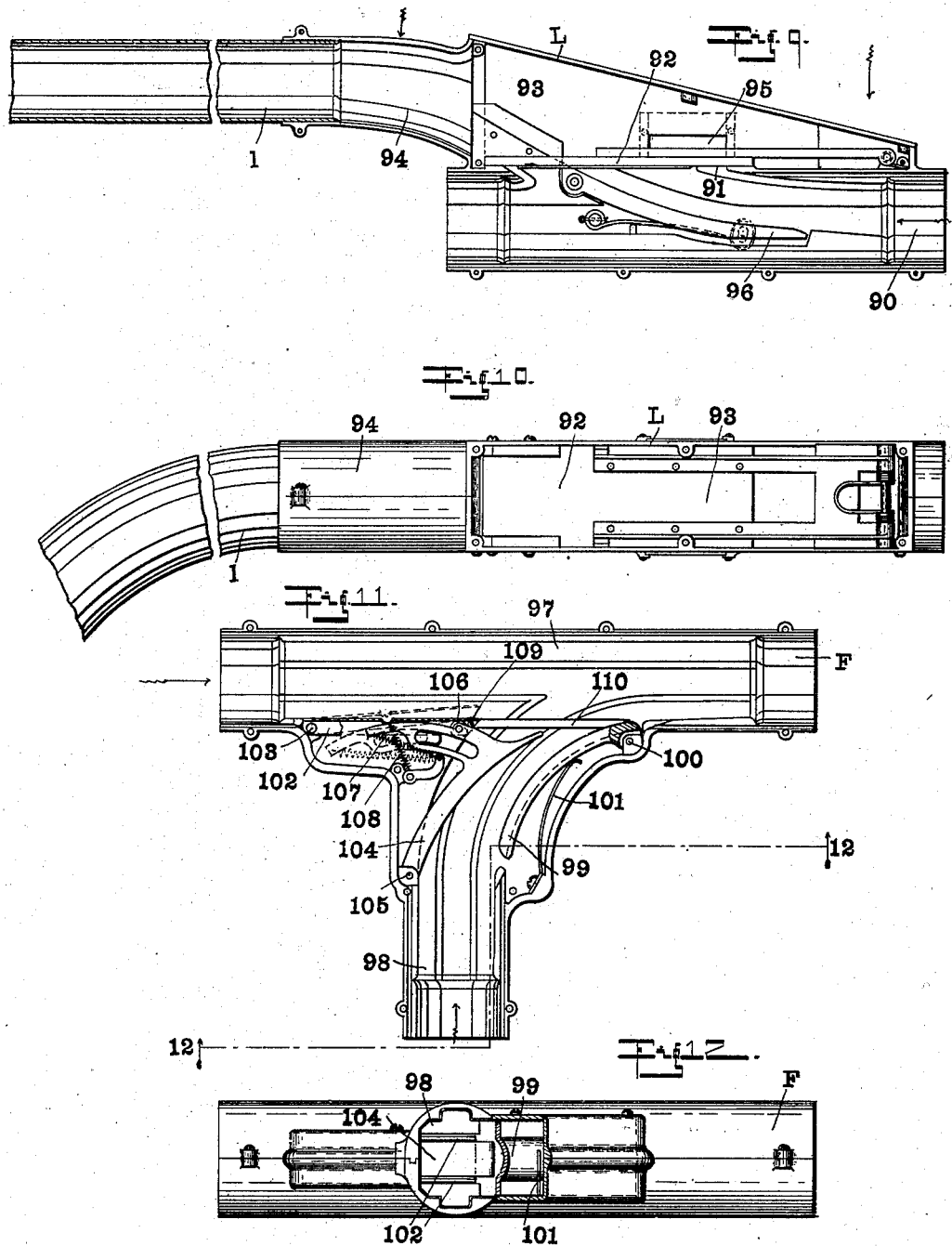
WITNESSES:  
INVENTOR  
Thomas Bemis  
BY  
ATTORNEYS No. 712,478. Patented Nov. 4, 1902.
T. BEMIS.
PNEUMATIC DESPATCH TUBE SYSTEM.
(Application filed May 17, 1902.)
(No Model.) 6 Sheets—Sheet 5.
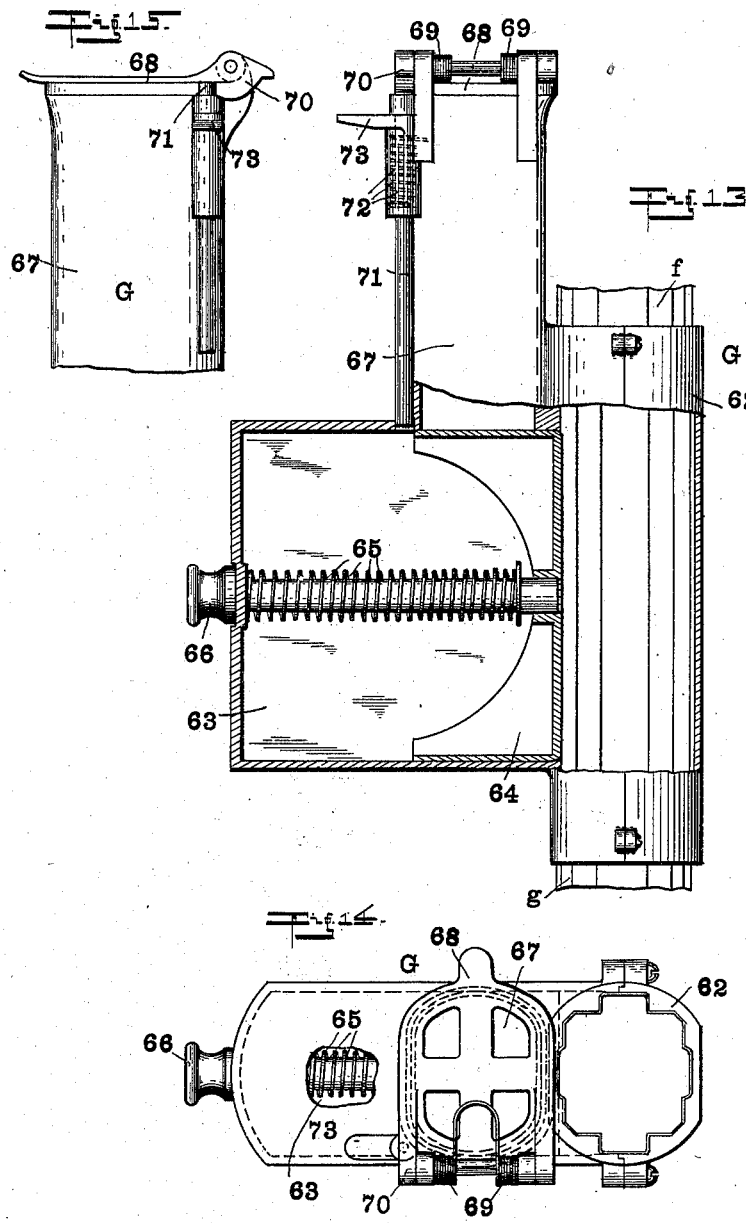
INVENTOR
Thomas Bemis

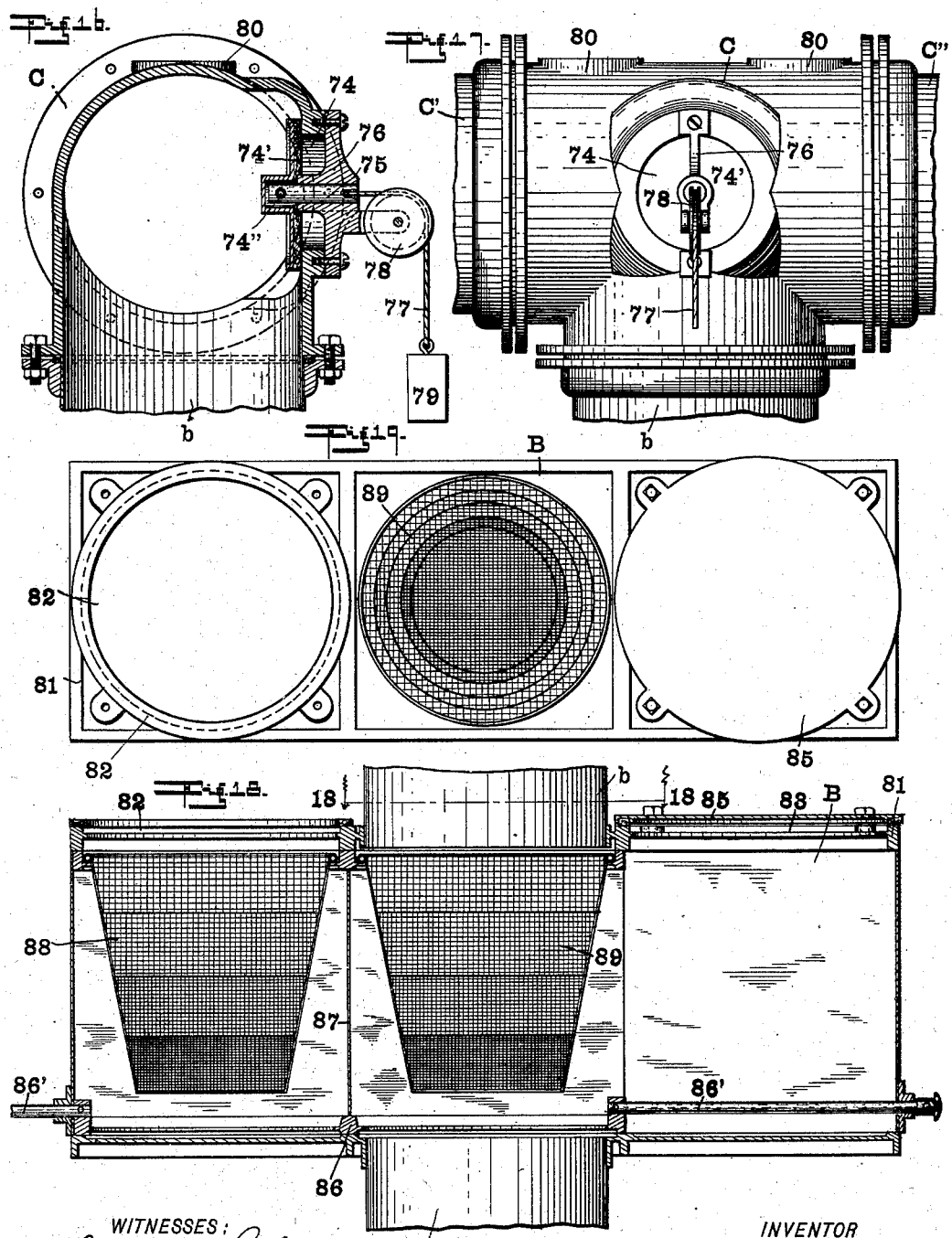

UNITED STATES PATENT OFFICE.

THOMAS BEMIS, OF INDIANAPOLIS, INDIANA.

PNEUMATIC-DESPATCH-TUBE SYSTEM.

SPECIFICATION forming part of Letters Patent No. 712,478, dated November 4, 1902.

Application filed May 17, 1902. Serial No. 107,799. (No model.)

*To all whom it may concern:*

Be it known that I, THOMAS BEMIS, a citizen of the United States, residing at Indianapolis, in the county of Marion and State of Indiana, have invented certain new and useful Improvements in Pneumatic-Despatch-Tube Systems, of which the following is a specification.

In pneumatic-despatch-tube systems it is essential that an adequate difference of pressure be created and maintained between the cashier's desk and the different stations in one direction and between each of said stations and the cashier's terminal in the other direction. It is also essential that efficient means be provided to direct the carriers through the proper portions of the system, so that each may be carried to its proper destination, and to provide means by which the carriers may be easily introduced into and discharged from the system both at the cashier's terminal and the several stations. Heretofore difficulty has been found in the provision of a system which would operate successfully when installed in the several stories of a tall building or where the distance between the cashier's desk and a station is considerable.

The object of my invention is, therefore, to provide an arrangement of forwarding and return pipes in conjunction with a trunk-line supply-pipe of such character that the piping connecting the cashier's terminal with a distant station is divided into sections or relays in each of which is established a substantially independent air-current; to provide means by which the descending return-pipes of the system will be free from air-currents and to provide means in such portions of the pipes to automatically control and limit the speed of passage of carriers therethrough, the carriers moving through these portions of the system by gravity; to provide an improved cut-out by means of which the carriers may be withdrawn from the action of a particular air-current, and, if desired, introduced into an independent relay air-current; to provide an improved form of terminal into which a carrier may be discharged and from which it cannot be removed without manual manipulation; to provide an improved carrier-injector into which carriers may be introduced without interrupting the air-current of the system and from which the carriers may be introduced into the air-current of the system, said injector being of such character that the operator may not open the external door until communication to the interior of the system is cut off and such that the external door may not be opened while a carrier is passing into the system; to provide an improved cashier's receiving-terminal into which a plurality of carriers may be discharged from the system without hindering the removal of the first-arriving carrier and in which the carriers may be automatically separated into groups; to provide improved means for preventing dirt and other foreign substances from passing through the system into the suction-creating device and for removing such dirt from the system; to provide an improved form of junction between two portions of the system discharging into a common pipe, and to provide such improvements in details of construction as will be hereinafter pointed out.

In systems of this class, especially in upper stories, the carrier loses much of its velocity, and this velocity is materially lessened by passage upward around a curve from a vertical pipe into a horizontal pipe.

A further object of my invention is therefore to so arrange the forwarding-pipes that after a carrier has passed a curve while going or soon after it has gone upward it shall pass into a depending pipe, through which it may gain sufficient momentum by gravity to enable it to pass with proper speed into another portion of the system.

The accompanying drawings illustrate my invention.

Figure 1 is a diagrammatic view of my improved system. Fig. 2 is a vertical sectional detail of the cashier's terminal. Fig. 3 is a plan of the discharge end thereof. Fig. 3ª is a view similar to Fig. 3 on a larger scale. Fig. 4 is a sectional detail of a relief-valve arranged in the descending portions of the system to automatically control the movement of carriers therethrough. Fig. 5 is a section of a cut-out valve D for enabling the withdrawal of a carrier from the action of one of the air-currents of the system, the form of valve in this view being that intended for use immediately before a terminal discharge; Fig. 6, a partial transverse section of the parts shown in Fig. 5. Fig. 7 is a section of a cut-out valve similar to the valve shown in Fig. 5, but modified slightly in order to adapt it for use in descending portions of the system to enable the withdrawal of the air-current from such portions of the system, but allowing the carrier to be withdrawn from the air-current and projected into the descending portions of the system. Fig. 8 is a section of a cut-out valve similar to that shown in Figs. 5 and 7, but modified so as to be used in portions of the system at the junction between two independent air-currents, the arrangement being such that a carrier may be passed from one air-current to the other through this valve; Fig. 9, an axial section of one of the switches; Fig. 10, a side elevation thereof in the direction indicated by the arrows, with the cover-plate removed so as to expose the valve; Fig. 11, an axial section of my improved junction; Fig. 12, a section on the line 12 12 of Fig. 11; Fig. 13, a partial axial section of my improved carrier-injector; Fig. 14, an end elevation thereof; Fig. 15, a detail thereof; Fig. 16, a sectional detail of the main suction-drum and relief-valve therefor; Fig. 17, an elevation of the parts shown in Fig. 16; Fig. 18, an axial section of my improved dirt-screening device, and Fig. 19 a section on line 18 18 of Fig. 18.

Referring now to Fig. 1 of the drawings, the system consists of the usual pressure-maintaining means, such as suction pump or fan A, into which leads a pipe $a$. Arranged in this pipe between the fan A and the rest of the system is my improved screen B, Figs. 18 and 19, which is connected by a pipe $b$ with the drum C C'', Figs. 16 and 17, which may be made in as many sections as desired and into which lead a plurality of pipes $c$, equal in number to the number of cashier's terminals. Forming an extension of drum C is a non-carrier-receiving trunk-line drum C', which is carried through or nearly through the length of the system and which may be decreased in size toward its farther end. Connecting with each pipe $c$ is a terminal cut-out D, Figs. 5 and 6, to the discharge side of which is connected a cashier's terminal E, Figs. 2, 3, and 3ª. Leading into each of the cut-out terminals D at the cashier's desk is a pipe $d$, each of which leads to and is arranged in one of the stories of the building and in each of which is arranged one or more junctions F, Figs. 11 and 12. Leading into each junction F is a pipe $f$, which proceeds from a point within easy access of a clerk, and arranged at the end of each of said pipes $f$ is one of my injectors G, Figs. 13, 14, and 15, which is connected by a pipe $g$ with the air side of a cut-out valve D, the discharge side of said cut-out valve leading through a pipe $e'$ to a discharge-terminal E', which is like one part of the terminal E, Figs. 3 and 3ª. Those pipes $d$ which are vertical are provided at suitable intervals with relief-valves H, Fig. 4, and at the upper end thereof with a cut-out valve I, Fig. 7, the air side of which leads into the drum C'.

Arranged adjacent the cashier's desk 25 (which in the present case is shown as in the lower floor, while the suction-fan is shown in the basement) is a plurality of receivers J, each of which leads into a forwarding-pipe $j$, each of said pipes leading to a particular portion of the system. Those pipes $j$ which lead to upper parts of the system pass somewhat higher than the discharge ends thereof, and at their upper ends are provided with a reverse curve $j'$, which leads into a cut-out valve K, Fig. 8, which serves to direct the air-current from the pipe $j$ into the trunk-line C', at the same time allowing the formation of a new air-current, which passes out therefrom through pipe $k$, the said pipe $k$ being led along the line of stations, preferably just above said stations, as shown in Fig. 1. Arranged in each pipe $k$ are one or more switches L, Figs. 9 and 10, a pipe $l$ connecting each of said switches with one of the station cut-out valves D.

Turning now to the particular construction of the different portions of my system, the cashier's terminal E is illustrated in Figs. 2, 3, and 3ª. This terminal lies immediately below one of the cut-out valves D and consists of a pipe 26, which communicates with the discharge side of the cut-out D. Pipe 26 leads into two or more pipes 27 and 27', and at the point of juncture I mount a divider which is pivoted at 28 and consists of a forward finger 29 and a pair of wings 30 and 30', wing 30 being adapted to be projected into pipe 27 when finger 29 blocks pipe 27', and wing 30' being adapted to project into pipe 27 when finger 29 blocks pipe 27. Any other suitable switch mechanism may be substituted for this alternating divider, if desired. Mounted at the end of each pipe 27 and 27' is a terminal which consists of a platform 31, which forms an extension of the lower side of the adjacent pipe. Mounted at the lower end of this platform is a buffer 32, which is yieldingly held in position by a spring 33, buffer 32 being adapted to be engaged by a carrier 34 of any well-known form. Platform 31 is about the length of a carrier and is unobstructed at its sides except at its upper end, where I provide upon opposite sides a pair of flaring lips 35, which extend downward toward the buffer 32, so that the distance between buffer 32 and lips 35 is less than a carrier length. Platform 31 is preferably somewhat wider at its lower end than the carrier, and the buffer is flanked at each side by outwardly-extending wing-walls 36. Extending over platform 31, parallel therewith, is a guard 37. The terminal just described when used at the cashier's end in conjunction with the pipes 27 and 27' is preferably made double, as shown in Fig. 2, and for convenience of the cashier the double terminal thus formed is preferably arranged at about an angle of thirty degrees to the horizontal, although not necessarily so. When used in the position E' at a station-terminal, only a single terminal is used, and this is preferably arranged vertically, although not necessarily so.

The cut-out valves D, I, and K are similar in most respects, but vary slightly in detail in order to adapt them for the particular places in which they are put in the system. The cut-out D is illustrated in Figs. 5 and 6 and consists, preferably, of a pair of mating sections 40, which form a carrier-passage 41 and an air-passage 42 leading from one side of the passage 41. The upper end of the passage 41 is adapted to receive a pipe $d$ or $l$, while the lower end of said passage is adapted to receive one of the pipes 26 or $e'$, and the lower end of the passage 42 is adapted to receive one of the pipes $c$ or $g$. Opposite the inner end of the passage 42 the wall of passage 41 is cut away, so as to form a V-shaped opening 43, the side 44 thereof extending diagonally across the passage 41, and this portion of passage 41 is closed by a valve 45, which is pivoted at 46 to the outer wall of passage 41 and is urged normally toward its seat by means of a light spring 47. Valve 45 carries on its inner face a guide, which is composed of a pair of lips 48, which extend inwardly from the face of the valve. Formed in the outer wall of passage 42, substantially opposite the opening which is closed by valve 45, is a relief-opening 49, which is normally closed by a valve 50. Pivoted within the cut-out 40 is an arm 51, which is extended into passage 41 somewhat above valve 45 and preferably carries a friction-roller 52. Arm 51 is connected by a link 53 with the valve 50. Projecting into passage 42 on a line with the lower side of opening 49 are one or more lugs 54, upon which may be laid a temporary valve 55, (shown in dotted lines in Fig. 5,) the purpose of which will appear.

The cut-out I differs from cut-out D merely in that valve 45 is inclosed in a casing 56, so that there can be no escape of air from passage 41 and so that no air can be drawn into the lower end of the passage 41 from the farther side of valve 45. The cut-out K is like cut-out I except that in the external wall of the casing 56 I form an opening 57, the effective size of which may be regulated by an adjustable plate 58.

From the construction of the cut-outs D, K, and I it will be seen that two adjacent currents in fact overlap—that is to say, the initial current continues clear to the valve which separates said current from the independent relay-current and that the relay-current begins immediately beyond this valve at a point which is in fact behind the point at which the initial current leaves the carrier-tube. By this means neither current acts against the other at the time when a carrier is passing from one current to another.

The relief-valve H consists of a pair of mating sections 59, into opposite ends of which are fitted ends of the vertical pipes $d$. Formed in one side of this relief-valve is an opening 60, which is normally closed by a valve 61, said valve having an arm 62, which extends into the line of the pipes $d$ $d$ and is adapted to be engaged by a carrier, so that as the carrier passes through the pipes $d$ and through the relief-valve H the valve 61 will be thrown so as to uncover opening 60, and thus allow the entrance of air into pipe $d$ behind the carrier.

The injector G (see Figs. 13, 14, and 15) consists of a main tubular body 62, into one end of which may be secured the tube $f$ and into the other end of which may be secured another tube $f$ or the tube $g$. Extending from one side of the main body 62 is a chamber 63, in which is mounted a valve or head 64, normally held by a spring 65 at one extreme of the chamber 63, so that its end lies in alinement with the inner wall of the passage in main body 62. Secured to valve 64 is a plunger 66, which projects from the chamber 63. Extending upward from chamber 63 is a receiving-tube 67, which is of a diameter and length sufficient to receive a single carrier, the upper end being closed by a door 68, held normally closed by a spring 69. Door 68 carries a lug 70, behind which is normally projected a catch-pin 71, urged into position by means of spring 72. (Shown in dotted lines in Fig. 13.) Pin 71 is provided with a finger-piece 73, and said pin projects downward alongside of the receiving-tube 67 and through the wall of chamber 63 into adjacency with the rear edge of the head 64, the arrangement being such that pin 71 may not be retracted from engagement with the lug 70 of door 68 unless valve 64 is in its normal position where it closes the lower end of the receiving-tube 67, and the arrangement also being such that when the valve 64 is in its normal position and pin 71 is withdrawn from engagement with lug 70 the said pin 71 will lock the valve 64 against movement.

The trunk-line drum C' runs nearly to the top of the building, and in order that it may not have to be made heavy to avoid collapsing in case of too great suction said drum communicates with drum C, and said drum is provided in one side with an opening 74, which is normally covered at its inner end by a valve 74', pivoted at 74" loosely to a pin 75, extending through a bearing 76. Attached to the outer end of pin 75 is a cord 77, which is passed over a pulley 78 and from thence downward, a weight 79 being attached to the lower end, said weight being of such size as to maintain the valve 74' over the inner end of the opening 74 under normal conditions; but when the vacuum within the drum C C' reaches a danger-point said valve will be pulled away from the inner end of the opening, and thus allow the ingress of air from the exterior, so as to prevent collapsing. Drum C is preferably of such form that additional sections C'' may be added at one end, and said drum C, together with the additions C'', are provided with openings 80, into which the pipes c may be conducted.

In the operation of a system of this kind it often occurs that dirt and foreign substances other than the carriers are introduced into the system, and it is desirable that means be provided to prevent this foreign matter from passing into and through the fan. It has heretofore been customary to provide a screen at or near each cashier's terminal; but, so far as I am aware, such devices are difficult of access, and a plurality of them is required in a system of any magnitude. I prefer, therefore, to introduce a separating-screen B between the suction-fan A and the entire system, said screen being of such character that it is easily accessible and such that it will prevent any material from passing into the fan. It is also such that foreign substances may easily be removed from the screen without interfering with the proper operation of the system. To this end the pipe b leads into a casing 81, which in length is somewhat more than three times the diameter of the pipe b, which leads into the middle of one side. Formed in the top of casing 81, at each side of pipe b, are openings 82 and 83, which are covered by removable cap 85. Mounted within casing 81 is a sliding frame 86, which is provided with a central vertical partition 87. Mounted upon opposite sides of the partition 87 are two screens 88 and 89, each of which is preferably formed in basket shape, as shown, and each of which is composed of reticulated or perforated walls, arranged in sections of different degrees of fineness, the finest being at he bottom and the coarsest at the top.

The switch L (which is similar in some respects to the switch described and claimed in my Patent No. 696,305, and the particular construction of which is described and claimed in a companion application) consists, primarily, of a pair of mating sections, which form a channel 90, in the opposite ends of which are secured sections of pipes k. One side of the channel 90 has an opening 91 formed therein, and this opening is normally closed by a valve 92, which valve is mounted within a chamber 93, from which leads a branch 94, to which the branch tube l is attached. Leading into chamber 93, back of valve 92, is an opening 95, through which an independent air-current is drawn. Mounted within the channel 90 is a switch 96, which is adapted to engage switch-pins, which are properly arranged on predetermined carriers.

The junction F, Figs. 11 and 12, consists of a pair of T-shaped mating sections, in which is formed a channel 97, from opposite ends of which lead pipes d, and into which leads a curved channel 98, into the outer end of which is secured one of the pipes f. The inner or convex wall of the channel 98 is formed by a tongue 99, which is pivoted at its forward end at 100 closely adjacent the channel 97. Tongue 99 is held in position by means of a spring 101. It sometimes occurs that a carrier moving through channel 97 and a carrier moving through channel 98 in the directions indicated by the arrows will reach the junction at substantially the same time, and in order to prevent an interference I pivot in the channel 97, adjacent the concave or outer side of channel 98, a stop-plate 102, which is pivoted at its rear end 103. I also mount within channel 98 a lever 104, which lever is pivoted at its rear end 105 and carries a roller 106, adapted to engage plate 102. Lever 104 is held normally projected into the channel 98 by means of a spring 107, and plate 102 is normally held out of the line of channel 97 by a spring 108. Pivoted at 109 in channel 97, adjacent the forward end of plate 102, is a guide-gate 110, which extends across the channel 98, and rests upon the forward or pivoted end of tongue 99, so as to bridge across channel 98.

As has been previously stated, there is preferably no air-current in any one of the downward pipes d, the car falling therethrough entirely by gravity; but when the carrier reaches the horizontal portions of said pipes it is necessary that the carrier be acted upon by a current of air, and for this purpose I form in the horizontal pipes, preferably in the elbow at the point of junction between said horizontal and downward pipes, an air-inlet 111, through each of which will be drawn an independent current of air.

In operation fan A will create a partial vacuum in drums C, C', and C'', so as to create a plurality of independent currents of air, as follows: one through each cashier's receiver J, the attached pipe j, the reverse elbow j', and from thence through the channel 42 of the cut-out K, so as to return through trunk-line C'; a current of air through each inlet 111, and from thence through the horizontal pipes d to the cashier's cut-out D, and from thence through the channel 42 thereof and through the pipe c to the drums C or C''; a current through the graduated opening 57 of the cut-out K, and from thence through pipes k and the channels 90 of all of the switches L, connected to said pipe k to the final cut-out D, (see the left hand of the second and third floors, Fig. 1,) through the channel 42 thereof, through pipe g, through the connected carrier-injector G, and through pipe f into the horizontal pipe d, and thence through channel 42 of cut-out I into the trunk-line C'; a partially independent air-current through the graduated opening 95 of each switch L, and from thence through chamber 93 and branch 94 thereof, through pipe l to the adjacent cut-out D, and from thence through the adjacent pipe g, carrier-injector G, and pipe f to the pipe d. With these air-currents established and it being understood that at the cashier's terminal there is preferably one receiver J for each floor or for each group of stations and similarly a cut-out D for each floor or group of station-terminals, as shown in Fig. 1, the operation is as follows: Suppose a carrier 34 to be inserted in the middle receiver J. The said carrier is drawn upward through pipe $j$ to the top of the building, passing beyond the tube $k$, into which it is finally destined to pass, and through the reverse elbow $j'$, said elbow being high enough above the tube $k$ so that although the velocity of the carrier is reduced almost to nothing by the time it has passed around the curve yet it will gain sufficient momentum by the action of gravity alone as it passes down through the depending pipe $j$ that it will have sufficient force when it passes into the cut-out K to strike arm 51 thereof, and thus through link 53 open valve 50. Before this has occurred valve 45 has been held in position by reason of the suction of the air-current passing through the branch 42 into the drum C'; but as soon as valve 50 is opened this suction is relieved, so that valve 45 is only maintained in position lightly by reason of spring 46, so that when the carrier strikes valve 45 between the guarding-lips 48 the valve gives way easily and is forced back into the position shown in dotted lines in Fig. 5, thus allowing the carrier to pass through the lower portion of the channel 41. It is to be noticed that owing to the temporary opening of opening 49 there is no tendency for the carrier to pass into air branch 42. As soon as the carrier passes arm 51 the door 50 is closed by reason of the action of the current of air through channel 42, so that as soon as the carrier passes valve 45 the said valve is drawn shut by the action of the air-current and the spring 46. After leaving valve 45 the carrier is caught by the independent air-current coming through opening 57 and passes through pipe $k$ into the first switch L, and if its switch-pins be properly placed the said pins will be engaged by the switch 96 and the carrier deflected so as to come into engagement with the valve 92 and force said valve open, so as to allow the carrier to pass into the branch 94, where it is caught up by the independent air-current which is coming through the opening 95. From thence the carrier passes through tube $l$ and into the cut-out D. When the carrier reaches the cut-out D, its action therein is exactly similar to its action in the cut-out K, except that there is no independent air-current through the lower portion of the channel 41, the carrier passing through said channel by gravity into the station-terminal E'. Suppose now that a carrier be introduced into the left-hand induction-receiver G on the upper floor. (See Figs. 13 to 15.) The operator in order to introduce the carrier into the system must leave plunger 66 free, so that spring 65 will push valve 64 beneath the lower end of the tubular receiver 67, and thus cut off communication into the system through door 68 and also prevent the leakage of any air into the system through the tube 67. When the head is in this position, the operator may, by pressing upon the finger-piece 73, withdraw pin 71 from behind lug 70 of door 68, and thus allow door 68 to be opened, said door being held open by the operator against the action of spring 69. The carrier may then be introduced into the tube 67, said carrier dropping upon the head 64. Valve 64, however, cannot be withdrawn until door 68 has been closed and pin 71 allowed to resume its normal position where it locks the door 68 against opening. The valve 64 may then be withdrawn, so as to allow the carrier to drop down into chamber 63 in alinement with the tube 67, but not as yet in position where it may pass into the tubes $f$. Valve 64 is then moved forward to its normal position, so as to shove the carrier out of chamber 63 and into alinement with tube $f$, so that the current of air passing from tube $g$ into the tube $f$ will catch up the carrier and project it through the tube $f$. It is to be noticed in connection with this carrier-injector that the door 68 may not be opened until the valve 64 blocks the passage from the tube 67 into the system, nor may it be opened until the pin 71 be withdrawn. When this pin is withdrawn to allow the opening of door 68, it is projected into position to prevent any movement of the valve 64; but the action of valve 64 is not automatic when door 68 has been closed upon the receiver, so that the operator may, if he desires, again open door 68 and withdraw the carrier; but the door 68 cannot under any circumstances be opened unless the valve 64 is in such position as to absolutely close communication between the pipe 67 and the carrying-pipe $f$. After being introduced into the pipe $f$ the carrier is drawn upward therethrough until it reaches channel 98 of the junction F. As it passes through this channel it engages lever 104 and forces said lever backward into the position shown in dotted lines in Fig. 1 the roller 106 of said lever operating against plate 102, so as to throw said plate into the position shown in dotted lines in Fig. 11, where it projects into the channel 97, and thus blocks the passage of a carrier through the channel 97. As the carrier proceeds it engages the gate 110 and swings said gate upon its pivot and passes into the channel 97, from thence passing through the horizontal pipe $d$. It may sometimes occur that two carriers will reach the junction at substantially the same time, so that a carrier passing through channel 98 will have just begun to force plate 102 into the channel 97. In such case it might happen that the two carriers would become stuck, and in order to prevent this the yielding tongue 99 has been provided. When such a conjunction of carriers occurs, one wall or the other must yield or the carriers will stick. In my construction the carrier passing through channel 97 will force plate 102 back to its normal position, and this through lever 104 will act upon the head of the carrier in channel 98, the tongue 99 yielding in front of said head. If the carrier passing through the channel 97 has reached the terminal first it will hold plate 102 down, so that a carrier coming in through channel 98 cannot get into a position where it will swing lever 104 until after the first arriving carrier has passed through channel 97. The carrier moves forward through the horizontal pipe $d$, and from thence through a suitable turn or curve into the vertical pipe $d$ and into a cut-out I, the air-current which has been carrying the carrier passing through the channel 42 of said cut-out and returning into the drum C'. As the carrier passes through the cut-out I it operates the valve 50 therein, so as to relieve the suction upon valve 45 thereof, so that the carrier may force said valve easily open and the carrier drop through the passage 41 thereof into the lower section of vertical pipe $d$. There is no air-inlet into the cut-out I beyond valve 45, nor is there any current of air through the depending pipe $d$, so that as the carrier drops therethrough by gravity alone it creates a vacuum behind itself which tends to retard its downward motion. If the distance of drop to the air-inlet 111 be not too great, there is no need to afford any relief; but if the drop be considerable this vacuum could become so much as to practically stop the carrier, and in order to prevent this I introduce into the long runs of depending pipe $d$ one or more of the relief-valves H, so that as the carrier passes downward and through one of these relief-valves (see Fig. 4) it strikes the arm 62 of valve 61 thereof, so as to open valve 61 and allow air to pass into the pipe above the carrier. The carrier drops through the vertical pipe $d$ until it reaches the inlet 111, where it is caught up by the current of air which is coming through said inlet and is carried by said air-current through the horizontal pipe $d$ into the proper cashier's cut-out D, where its action upon valves 50 and 45 thereof is the same as in the cut-outs K and I, already described, and the same as its action in the cut-out D at the station-terminal. The carrier passes through this cut-out D and from thence into pipe 26 of one of the cashier's terminals E, where it comes into contact with finger 29 of the divider and is deflected therethrough into pipe 27, when the parts are in the position shown in Fig. 2. As the carrier proceeds through pipe 27 it engages wing 30 of the divider and automatically throws finger 29 thereof so as to block pipe 27, so that the next carrier arriving at this terminal will pass into the pipe 27'. The carrier passes through pipe 27 and is arrested in its movement by the buffer 32. In this position (see Fig. 3) the carrier is held with its lower end against buffer 32, while its upper end lies between fingers 35, the carrier resting upon the platform 31 beneath the guard 37. In this position the carrier cannot be accidentally misplaced, but the operator may by grasping the lower end of the carrier swing the same horizontally through the position shown in Fig. 3ᵃ and easily withdraw the carrier. That portion of pipes 27 and 27' between platform 31 and the divider 29 30 30' is sufficient to allow the reception of a number of carriers, so that when the end carrier is withdrawn the other carriers will drop down into position upon the platform 31, so that each may be readily withdrawn in turn. If for any reason the vacuum within drums C C' C" becomes too great, valve 74' yields, so as to allow the inflow of a sufficient supply of air to reduce the pressure.

As has been previously stated, the separator B lies within the entire system and the fan A, and in Figs. 18 and 19 the screen-basket 89 is shown in alinement with the pipes $b$ and $a$, so that any material which passes through the system and through pipe $b$ is caught in this basket, the finest mesh in the bottom catching all fine dirt, while the coarser meshes at the upper end prevent passage of large material, at the same time giving plenty of passage for the air. At any time when the material has gathered in the basket 89 to too great an amount the operator by grasping the operating-bar 86' draws frame 86 from one side of casing 81 to the other, so as to bring screen 89 beneath opening 83 and bring screen 88 at the same time in alinement with pipes $b$ and $a$. Partition 87 prevents communication between the chamber of basket 89 and the pipes $a\ b$, so that the efficiency of the system is not at all impaired. The operator may therefore remove cover 85 and thoroughly clean the basket 89, which is preferably made removable, the upper flange thereof merely resting upon a suitable flange in the frame 86, as shown. When basket 88 has become partially filled, it may be cleaned in the same manner by again returning frame 86 to its initial position, so that the basket 88 lies beneath the cover 84.

It often occurs in systems of the class described that repairs are needed in one line while the remaining lines should be left in condition for operation. The suction device is regulated so as to create proper pressures in all of the lines, and while the air from any line may be discontinued by opening the nearest valve 50 yet this would result in a waste of power, because of the drawing in of air through said valve into the portion of the line communicating with the adjacent passage 42, and thus weakening the other lines. In order to avoid this, therefore, the lugs 54 are provided, so that a leather or other suitable plate 55 may be temporarily laid across the passage 42, thus cutting out that portion of the system above the valve 50 and at the same time preventing the inlet of any air into the system below said valve.

I claim as my invention—

1. In a pneumatic-despatch-tube system, the combination with a pressure-maintaining device, of a non-carrier-receiving trunk-line pipe leading thereto, a plurality of overlapping independent pipe-lines leading into said trunk-line at different points in its length, and cut-outs arranged between and connecting adjacent overlapping portions of independent pipe-lines, each of said cut-outs being provided with means by which carriers may be transferred from one pipe-line to another.

2. In a pneumatic-despatch-tube system, the combination, with a suction device, of a non-carrier-receiving trunk-line leading thereto, a pipe-line leading from any desired point into a cut-out, means in said cut-out for directing the air-current from said pipe-line into the trunk-line, a relay pipe-line emanating from said cut-out and leading to the suction device and having an air-inlet near its point of emanation, means arranged in said cut-out for maintaining the independence of the air-currents in the two pipe-lines, and means by which carriers may be transferred from the first pipe-line into the relay pipe-line.

3. In a pneumatic-despatch-tube system, the combination, with a suction device, of a non-carrier-receiving trunk-line leading thereto, a pipe-line leading from a desired point into a cut-out, means in the said cut-out for directing the air-current in the pipe-line into the trunk-line, a relay pipe-line emanating from the cut-out and leading into a second cut-out, an air-inlet near the point of emanation of the relay pipe-line, means in the first cut-out for maintaining the independence of the air-currents in the first pipe-line and the relay pipe-line, and means in said cut-out by which carriers may be transferred from the first pipe-line to the relay pipe-line, means in the second cut-out for directing the air-current in the relay pipe-line into the trunk-line and for preventing the passage of air from the relay pipe-line into a depending pipe-line, the said depending pipe-line emanating from the second cut-out, and means in the second cut-out for directing a carrier into said depending pipe-line from the relay pipe-line.

4. In a pneumatic-despatch-tube system, the combination, with a suction device, of a non-carrier-receiving trunk-line leading thereto, a pipe-line leading from a desired point into a cut-out, means in the said cut-out for directing the air-current in the pipe-line into the trunk-line, a relay pipe-line emanating from the cut-out and leading into a second cut-out, an air-inlet near the point of emanation of the relay pipe-line, means in the first cut-out for maintaining the independence of the air-currents in the first pipe-line and the relay pipe-line, means in said cut-out by which carriers may be transferred from the first pipe-line to the relay pipe-line, means in the second cut-out for directing the air-current in the relay pipe-line into the trunk-line and for preventing the passage of air from the relay pipe-line into a depending pipe-line, the said depending pipe-line emanating from the second cut-out, means in the second cut-out for directing a carrier into said depending pipe-line from the relay pipe-line, a continuation of said depending pipe-line at an angle of inclination less than enough to allow a carrier to move therethrough by gravity, the said continuation communicating with the suction device at its forward end, and an air-inlet leading into said continuation at or near its junction with the depending pipe-line.

5. In a pneumatic-despatch-tube system, the combination, with a suction device, of a non-carrier-receiving trunk-line leading thereto, a pipe-line leading from a desired point into a cut-out, means in the said cut-out for directing the air-current in the pipe-line into the trunk-line, a relay pipe-line emanating from the cut-out and leading into a second cut-out, an air-inlet near the point of emanation of the relay pipe-line, means in the first cut-out for maintaining the independence of the air-currents in the first pipe-line and the relay pipe-line, means in said cut-out by which carriers may be transferred from the first pipe-line to the relay pipe-line, means in the second cut-out for directing the air-current in the relay pipe-line into the trunk-line and for preventing the passage of air from the relay pipe-line into a depending pipe-line, the said depending pipe-line emanating from the second cut-out, means for directing a carrier into said depending pipe-line from the relay pipe-line, a relief-valve arranged at an intermediate point in said depending pipe-line, and means operated by the passage of a carrier therethrough for operating said relief-valve so as to allow an inflow of air into the depending pipe-line above the carrier.

6. In a pneumatic-despatch-tube system, the combination with a suction device, of a pipe-line beginning at a desired point and extending higher than said point, a reverse curve extending from the highest point in said pipe-line and having a depending extension, a relay pipe-line emanating from a cut-out and having an air-inlet at or near the cut-out, said relay pipe-line communicating with the suction device, and said cut-out arranged between said depending extension and the relay pipe-line, said cut-out having cut-out mechanism automatically operated by the movement of a carrier for transferring the carrier from the first pipe-line to the relay pipe-line, and for deflecting the air-current in the first pipe-line to the suction device.

7. In a pneumatic-despatch-tube system, the combination, with a suction device, of a non-carrier-receiving trunk-line leading thereinto, a pipe-line leading from a desired point to a cut-out, said pipe-line having a portion which extends above and then returns downward to the cut-out, the said cut-out having means for deflecting the air-current in the pipe-line into the trunk-line, a relay pipe-line extending from the cut-out to the suction device, an air-inlet leading into said relay pipe-line near the cut-out, and a valve arranged to normally close communication between the pipe-line and the relay-line but adapted to yield so as to allow the passage of a carrier from the pipe-line into the relay-line through the cut-out.

8. In a despatch-tube system, a depending pipe-line through which a carrier drops by gravity alone, a relief-valve arranged therein intermediate its length, and means operated by the passage of a carrier for operating said valve so as to intermittently allow air to enter the pipe-line above a passing carrier.

9. In a pneumatic-despatch-tube system, the combination with a pipe-line, of means for creating an air-current therein, a depending pipe-line forming a continuation of the first-mentioned pipe-line, and means for deflecting the air-current in the first-mentioned pipe-line from the depending pipe-line.

10. In a pneumatic-despatch-tube system, the combination with a pipe-line, of means for creating an air-current therein, a depending pipe-line forming a continuation of the first-mentioned pipe-line, means for deflecting the air-current in the first-mentioned pipe-line from the depending pipe-line, and a relief-valve arranged in said depending pipe-line intermediate its length said valve being constructed to be opened by the passage of a carrier thereby.

11. In a pneumatic-despatch-tube system, the combination, with a depending pipe-line, of a continuation of said pipe-line arranged at an angle less than that sufficient to allow a carrier to move properly therethrough by gravity, and means for creating an air-current in the said continuation only.

12. In a pneumatic-despatch-tube system, the combination with a depending pipe-line, of a relief-valve arranged intermediate the length of said depending pipe-line and constructed to be operated by a carrier as it passes, a continuation of said depending pipe-line arranged at an angle less than sufficient to allow a carrier to move therethrough by gravity, and means for creating an air-current in the said continuation.

13. In a pneumatic-despatch-tube system, the combination with a suction device, of a pipe-line leading from a desired point, a cut-out arranged in said pipe-line, connections between said cut-out and the suction device, a depending pipe-line extending from said cut-out, means for normally preventing the air-current in the initial pipe-line from passing into the depending pipe-line, a continuation pipe-line extending from the lower end of the depending pipe-line at an angle less than sufficient to allow a carrier to properly move therethrough by gravity, a connection between said continuation pipe-line and the suction device, and an air-inlet leading into said continuation pipe-line at or near its junction with the depending pipe-line.

14. In a pneumatic-despatch-tube system, the combination with a suction device, of a pipe-line leading from a desired point, a cut-out arranged in said pipe-line, connections between said cut-out and the suction device, a depending pipe-line extending from said cut-out, means for normally preventing the air-current in the initial pipe-line from passing into the depending pipe-line, a continuation pipe-line extending from the lower end of the depending pipe-line at an angle less than sufficient to allow a carrier to properly move therethrough by gravity, a connection between said continuation pipe-line and the suction device, an air-inlet leading into said continuation pipe-line at or near its junction with the depending pipe-line, and a relief-valve arranged in the depending pipe-line intermediate its length and constructed to be opened by the passage of a carrier through the depending pipe-line.

15. In a despatch-tube system, the combination with a depending pipe-line having an opening in one side thereof intermediate its length, of a valve 61 pivoted at its upper end and adapted to normally close said opening, and an arm carried by said valve and projecting into the interior of the pipe-line in position to be engaged by a passing carrier before it passes the valve, substantially as and for the purposes set forth.

16. In a pneumatic-despatch-tube system, the combination with a suction device, of a suction-drum, a plurality of suction-pipes leading into said drum, a connection between said drum and suction device, and a screen arranged in said connection, for the purpose set forth.

17. In a pneumatic-despatch-tube system, the combination with a suction device, of a plurality of suction-pipes leading from the several parts of the system into a chamber, a pair of screens arranged in said chamber, a connection between said chamber and the suction device, and means for shifting said screens alternately into alinement with the inlet-pipe.

18. In a pneumatic-despatch-tube system, the combination with a suction device and the pipe $a$ leading thereinto, of a screen-chamber arranged at the end of said pipe, a pipe leading from the system into said chamber, a double-compartment screen-frame arranged within said chamber, a pair of screen-baskets carried in the two compartments of said frame, and means for alternately shifting the two baskets into operative and cleaning positions.

19. In a pneumatic-despatch-tube system, a screen therefor consisting of a basket formed of a plurality of reticulated or perforated portions varying in fineness from the bottom upward.

20. In a pneumatic-despatch-tube system, a junction therefor consisting of a pair of converging channels, and a transversely-yielding wall forming one side of one of the channels adjacent the point of junction.

21. In a pneumatic-despatch-tube system, a junction therefor consisting of a pair of converging channels, a pair of stops arranged in said channels, intermediate connections between said stops whereby each will be projected into its channel when the other is out of the line of its channel, and a transversely-yielding portion forming the wall of one of the channels adjacent the point of junction in opposition to the stop therein.

22. In a pneumatic-despatch-tube system, a junction therefor consisting of a pair of converging channels, a plate 106 pivotally mounted in one of said channels and extending toward the point of junction, a lever 104 pivotally mounted in the other channel and extending toward the point of junction and toward the free end of the plate and having a portion directly engaging the plate, means for normally projecting the lever into the line of its channel and for normally withdrawing the plate from the line of its channel, substantially as and for the purposes set forth.

23. In a pneumatic-despatch-tube system, a junction therefor consisting of a pair of converging channels, a plate 106 pivotally mounted in one of said channels and extending toward the point of junction, a lever 104 pivotally mounted in the other channel and provided with means for engaging the plate, means for normally projecting the lever into the line of its channel and for normally withdrawing the plate from the line of its channel, and a lip 99 pivotally mounted in one of the channels in opposition to the lever 104 and yieldingly supported in normal position, substantially as and for the purposes set forth.

24. In a pneumatic-despatch-tube system, a carrier-ejector therefor consisting of a carrier-receiving chamber, a communicating passage between said chamber and the receiving-pipe of the system, a valve arranged to close communication between the carrier-receiving chamber and the system pipe and operable from the exterior by the operator, a door arranged to close the receiving-opening of the carrier-receiving chamber and operable from the exterior by the operator, and an intermediate locking mechanism between the door and valve whereby either the door or valve may be freely operated and the operation of either will prevent the operation of the other until the operated one be returned to normal position.

25. In a despatch-tube system, a receiving-terminal therefor consisting of a receiving-platform unobstructed at its sides, a buffer carried by said platform at its farther end in position to engage a carrier, means for attaching the opposite end of the platform to a despatch-tube, and a pair of lips arranged at opposite sides of said platform at said end and extending toward the buffer to a distance less than a carrier length therefrom.

26. In a despatch-tube system, a receiving-terminal therefor consisting of a carrier-receiving platform unobstructed at its sides, a buffer arranged at the farther end of said platform, guards flanking said buffer, means for attaching the opposite end of said platform to a despatch-tube, and lips arranged upon opposite sides of the platform at said end and extending toward the buffer to within less than a carrier length therefrom.

27. In a despatch-tube system, a receiving-terminal therefor consisting of a carrier-receiving platform, a buffer arranged at the farther end of said platform, guards flanking said buffer, means for attaching the opposite end of said platform to a despatch-tube, lips arranged upon opposite sides of the platform at said end and extending toward the buffer to within less than a carrier length therefrom, and a guard 37 extending over the platform, substantially as and for the purpose set forth.

28. In a despatch-tube system, a terminal therefor consisting of a plurality of pipes emanating from a single pipe, a carrier-receiver for each of said pipes, and means for automatically distributing carriers arriving through the single pipe to the plurality of receivers.

29. In a despatch-tube system, a terminal consisting of a pair of pipes emanating from a single pipe, a receiver for each of said pipes, a divider arranged at the point of junction of said pipes, and means arranged in each of the pipes for automatically reciprocating the divider whereby the carriers will be alternately discharged into the two receivers.

30. In a despatch-tube system, a terminal therefor consisting of a pair of pipes diverging from a single pipe, a divider 29 pivoted at the point of divergence and provided with a pair of divergent wings 30 and 30', and a carrier-receiver arranged at the end of each of said pipes, substantially as and for the purposes set forth.

31. In a pneumatic-despatch-tube system, a cut-out therefor having a carrier-passage extending therethrough, a valve arranged to close said passage, an air-passage leading from the carrier-passage at a point behind the valve and having a relief-opening thereinto, a relief-valve arranged to normally close said relief-opening, and means to be operated by a carrier before it reaches the first-mentioned valve for opening the relief-valve.

32. In a pneumatic-despatch-tube system, a cut-out having a carrier-passage formed therethrough, a valve arranged to normally close said passage, an air-passage leading from the carrier-passage behind the valve and having a relief-opening leading thereinto, a relief-valve arranged to normally close said relief-opening, an arm normally projecting into the carrier-passage behind the first-mentioned valve, and a connection between said arm and the relief-valve.

33. In a pneumatic-despatch-tube system, a cut-out therefor having a carrier-passage formed therethrough, a valve arranged to normally close said passage, guides carried by the inner or rear face of said valve and projecting into the carrier-passage, and an air-passage leading from the carrier-passage from behind the valve.

34. In a pneumatic-despatch-tube system, a cut-out consisting of a casing having a carrier-passage formed therethrough and having an opening formed in its side intermediate the length of the said carrier-passage so as to form an inclined forward end for the rear portion of said carrier-passage, a valve arranged to engage said inclined end so as to normally close the forward end of the rear portion of said carrier-passage, an air-passage leading from said rear portion of the carrier-passage and having a relief-valve arranged therein, and means operated by the carrier for opening the relief-valve before the first-mentioned valve is engaged by the carrier.

35. In a pneumatic-despatch-tube system, a cut-out for the junction between a current-carrying pipe-line and a non-current-carrying pipe-line, consisting of a casing having a carrier-passage formed therethrough said carrier-passage being constructed to receive a current-carrying pipe-line at one end and a non-current-carrying pipe-line at the other end, a valve arranged in said passage between the ends thereof, an air-passage leading from the air-current-carrying side of the valve and having a relief-valve arranged therein, and means operated by the passage of a carrier through the carrier-passage for opening the relief-valve before the first-mentioned valve is opened.

36. In a pneumatic-despatch-tube system, a cut-out to be placed between two independent air-current-carrying pipe-lines, consisting of a casing having a carrier-passage leading therethrough, said passage being adapted to receive the pipes of the two independent lines at its opposite ends, and having an air-passage leading from one end of said carrier-passage, and an air-passage leading into the other end of said carrier-passage, a valve arranged in the carrier-passage so as to normally close communication between the two air-passages, a relief-valve arranged in that air-passage leading from the rear side of said first-mentioned valve, and means operated by the passage of the carrier through the carrier-passage for operating said relief-valve.

37. In a pneumatic-despatch-tube system, a cut-out therefor consisting of a casing having a carrier-passage leading therethrough, a valve arranged to normally close said carrier-passage, an air-passage leading from the carrier-passage behind the valve, a relief-valve arranged in said air-passage, and means for supporting a temporary valve in the air-passage in front of the relief-valve opening.

38. In a pneumatic-despatch-tube system, a carrier-injector therefor consisting of a casing having a main tubular body adapted to receive the carrying-pipe, a chamber communicating with said tubular portion, a carrier-receiving pipe communicating with said chamber out of alinement with the main tubular body, a valve arranged in said chamber at the lower end of the carrier-receiving pipe, a door arranged to close the outer end of said carrier-receiving pipe, and a lock-pin operable by the operator and arranged between the said door and valve so as to engage the valve or the door, the arrangement being such that the lock-pin cannot be withdrawn from engagement with the door except when the valve closes communication between the carrier-receiver and the chamber and such that when the lock-pin is withdrawn from engagement with the door it will lock the valve in position until the door has been returned to closed position, substantially as and for the purposes set forth.

39. In a despatch-tube system, the combination with a carrier stop or buffer, of a carrier-pipe arranged in conjunction with said stop with its fixed end less than a carrier length from said stop, so as to leave an opening between said fixed end and the stop of a length less than the carrier and through which single carriers may be withdrawn in two directions.

40. In a pneumatic-despatch-tube system, the combination with a suction device, of a non-carrier-receiving trunk-line pipe leading thereinto, a pipe-line leading from a desired point to a cut-out, said pipe-line having a portion which extends above and then returns downward to the cut-out, the said cut-out, having a passage for deflecting the air-current in the pipe-line into the trunk-line, a relief-valve arranged in said passage to be opened by the passage of a carrier, a relay pipe-line extending from the cut-out to the suction device, an air-inlet leading into said relay-line near the cut-out, and a valve arranged to normally close communication between the pipe-line and the relay-line but adapted to yield so as to allow the passage of a carrier from the pipe-line into the relay-line through the cut-out.

41. In a pneumatic-despatch-tube system, the combination with a suction device, of a non-carrier-receiving trunk-line pipe leading thereinto, a plurality of independent pipe-lines leading into said trunk-line at different points in its length, cut-outs arranged between and connecting adjacent portions of the independent pipe-lines, each of said cut-outs being provided with means by which carriers may be transferred from one pipe-line to another, and a relief-valve arranged behind each of said transferring means and arranged to be operated by the passage of the carrier.

42. In a pneumatic-despatch-tube system, the combination with a suction device; of a non-carrier-receiving trunk-line pipe leading thereto; a pipe-line leading from any desired point into a cut-out; said cut-out, comprising a carrier-passage, an air-passage leading therefrom, a valve arranged in the carrier-passage in front of the air-passage, a relief-valve arranged in the air-passage, and means operated by the passage of a carrier for operating said relief-valve; and a relay pipeline emanating from said cut-out and leading to the suction device and having an air-inlet near its point of emanation.

43. In a pneumatic-despatch-tube system, the combination of a carrier-channel having an air-passage leading therefrom and a relief-inlet leading thereinto, a valve arranged to close the carrier-channel beyond the relief-opening and air-passage, and a relief-valve arranged to normally close the relief-inlet and to be opened by the passage of a carrier through the channel before it reaches the first-mentioned valve.

44. In a pneumatic-despatch-tube system, a carrier-injector therefor consisting of a carrier-receiving chamber, a door to close the outer end of said chamber, a valve to close the inner end of said chamber, and intermediate locking mechanism, continually under the control of the operator, for engaging the door or valve, whereby the locking mechanism cannot be withdrawn from the valve until the door is closed and cannot be withdrawn from the door until the valve is in position to close the inner end of the chamber.

45. In a pneumatic-despatch-tube system, a carrier-injector therefor consisting of a carrier-receiving chamber, a door to close the outer end of said chamber, a valve to close the inner end of said chamber, and a lockpin 71 continually under control of the operator and arranged to engage the door or valve, whereby the pin cannot be withdrawn from the valve until the door is closed and cannot be withdrawn from the door until the valve is in position to close the inner end of the chamber.

46. In a despatch-tube system, a receiving-terminal therefor consisting of a carrier-tube having a fixed end, and an abutment arranged adjacent the end of said tube at slightly less than a carrier length therefrom whereby a carrier may be removed therefrom only by swinging the end adjacent the abutment.

47. In a despatch-tube system, the combination, with a carrier-tube, of a valve arranged therein, an outlet leading from the tube immediately adjacent the rear of the valve, an inlet leading into the tube immediately adjacent the front of the valve, and means for maintaining separate air-currents in the same direction upon opposite sides of the valve whereby the current in the rear part of the tube will continue to act upon the carrier until after it has been engaged by the current in front of the valve.

48. In a despatch-tube system, the combination, with a carrier-tube, of a valve arranged diagonally therein with its free end forward, an outlet leading from said tube to the rear of the valve and immediately adjacent the free end thereof, an inlet leading into said tube in front of the valve and immediately adjacent the fixed end thereof, and means for maintaining separate air-currents in the same direction upon the two sides of the valve whereby two overlapping independent currents are maintained.

In witness whereof I have hereunto set my hand and seal, at Indianapolis, Indiana, this 13th day of May, A. D. 1902.

THOMAS BEMIS. [L. S.]

Witnesses:
ARTHUR M. HOOD,
JAMES A. WALSH.